O. F. BECK, J. W. SPEERS AND R. R. JONES.
VULCANIZING APPARATUS.
APPLICATION FILED MAR. 4, 1919.

1,350,696.

Patented Aug. 24, 1920.
2 SHEETS—SHEET 1.

Witness:

Inventors
Oscar F. Beck
James W. Speers
Robert R. Jones

O. F. BECK, J. W. SPEERS AND R. R. JONES.
VULCANIZING APPARATUS.
APPLICATION FILED MAR. 4, 1919.
1,350,696.
Patented Aug. 24, 1920.
2 SHEETS—SHEET 2.
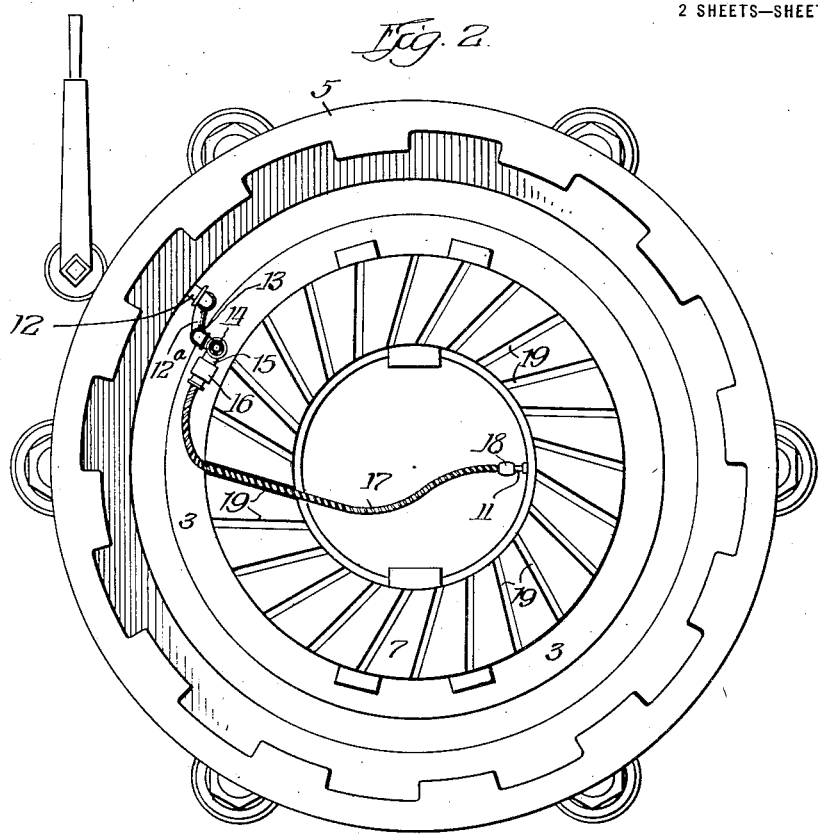
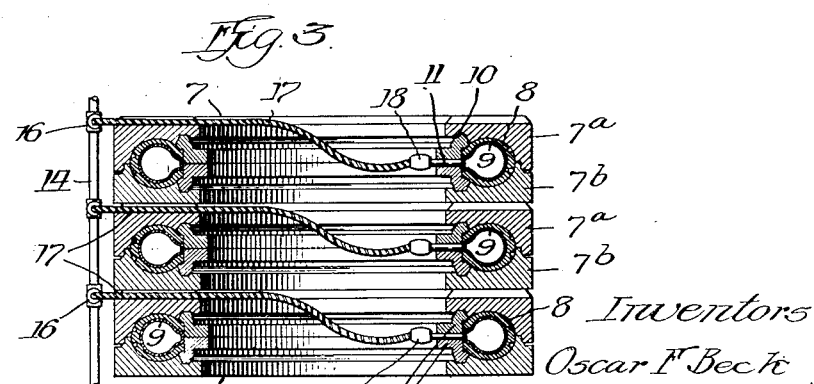

UNITED STATES PATENT OFFICE.

OSCAR F. BECK, OF LAWNDALE, AND JAMES W. SPEERS AND ROBERT R. JONES, OF AKRON, OHIO, ASSIGNORS TO THE FIRESTONE TIRE AND RUBBER COMPANY, OF AKRON, OHIO, A CORPORATION OF OHIO.

VULCANIZING APPARATUS.

1,350,696.   Specification of Letters Patent.   Patented Aug. 24, 1920.

Application filed March 4, 1919. Serial No. 280,529.

*To all whom it may concern:*

Be it known that we, OSCAR F. BECK, JAMES W. SPEERS, and ROBERT R. JONES, all citizens of the United States, said BECK residing at Lawndale and said SPEERS and JONES residing at Akron, in the county of Summit, State of Ohio, have invented certain new and useful Improvements in Vulcanizing Apparatus, of which the following is a specification.

This invention relates to apparatus for vulcanizing pneumatic tires and especially to the vulcanization of the type of tire which is cured while being expanded by fluid pressure exerted upon the inside of the casing either by an expansible core or "air bag" or by fluid pressure admitted directly to the interior of the casing. In former constructions, use has been made of a plurality of flexible pipes each leading from a source of supply to the interior of the tire with separate pressure indicators so that the pressure in the several tires may be ascertained, or by a series of flexible connections between the molds.

These constructions are imperfect in that the several lines of flexible hose are liable to become pinched or entangled in the operation of the ram, are expensive, and leak very easily. Other forms of apparatus have been devised for this purpose, but have all proved clumsy and unsatisfactory in many ways.

It is the purpose of this invention to improve upon present forms of mechanism for expanding tires while in the vulcanizer, and to construct a type of apparatus in which the amount of flexible hose shall be reduced to a minimum. It is also a purpose to provide valve mechanism, in connection with the vulcanizer so that the interior of the several molds will be isolated and a leak in one tire or air bag will not affect the pressure in the other air bags stacked in a single "heat" in the vulcanizer.

This latter purpose is accomplished by means of a valve for each mold which will be open while the pressure is being applied before the molds are heated up, but which will close when vulcanizing temperature is reached, and remains closed during vulcanization, and will open after vulcanization so that the pressure may be removed before the vulcanizer is opened. This result may be accomplished in a variety of ways, but a convenient and automatic method of doing this is afforded by a thermostatic valve for each mold which is so adjusted as to close at or about the vulcanization temperature, but will remain open below that temperature.

Other objects and advantages will appear from a description of the apparatus embodying this invention, it being understood that changes and modifications may be made within the scope of the appended claims without departing from the spirit of this invention.

Fig. 2 is a plan view with the top removed.

Fig. 3 is a transverse section through a group of molds.

Figure 1:
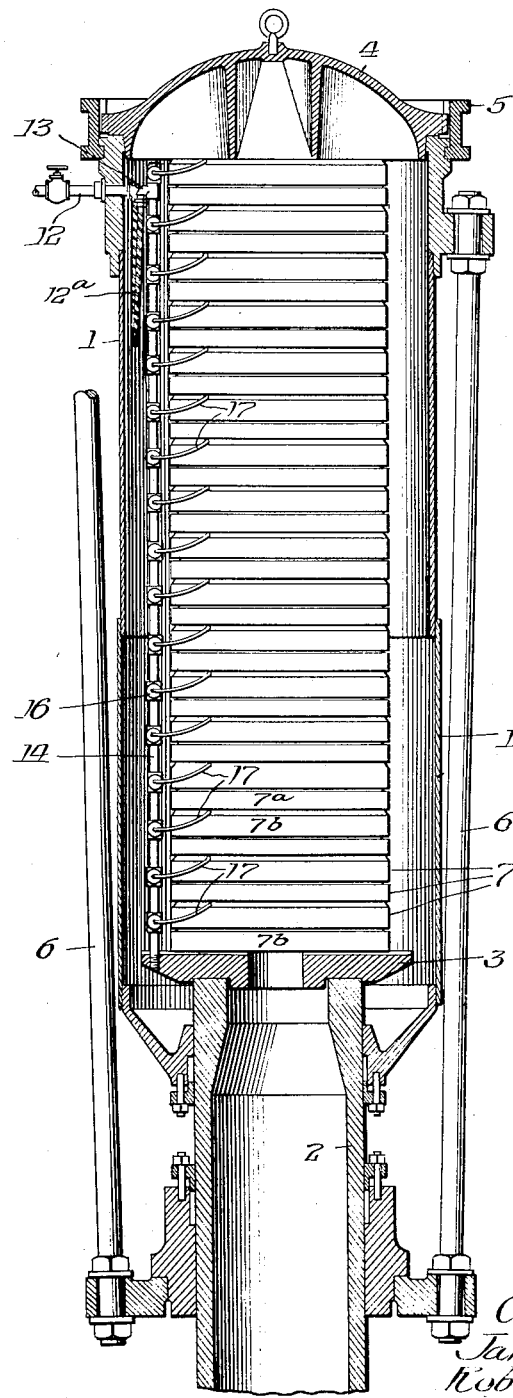
Figure 1 is a vertical section through a vulcanizer closed, and ready for vulcanization.

The improvements forming the subject matter of this invention are designed to be incorporated in any type of vulcanizer, and especially a vertical press such as now in common use for curing tires. One of these presses is shown in the drawings in which 1 is the press cylinder, 2 the hydraulic ram and 3 the platen. Letter 4 indicates the usual top, 5 the locking ring and 6 the tie rods or braces.

The molds which are used in connection with this invention are the standard two part molds designated by the numeral 7, 7$^a$ being the top half of the mold and 7$^b$ the bottom half. The tire is indicated at 8, the air bag or inflatable core at 9, the bead rings at 10 and the valve stem at 11.

The air or water under pressure to inflate the tire is admitted and exhausted through a pipe 12, set in the top of the vulcanizer and provided within the vulcanizer with a flexible length of tubing 12$^a$ and releasable connection 13, by which the pipe may be connected to a header or manifold 14 extending at one side of the stack of molds, the lower end being secured to the platen and movable therewith. Any other connection may be provided between the pipe and the manifold which will permit the platen and manifold to move when the vulcanizer is being filled or unloaded. The union shown makes an easy and efficient means of connecting the source of pressure supply with the manifold.

From the manifold extends a series of branch pipes 15, equal to the largest number of molds received in the vulcanizer, in each of which branches is mounted a valve 16. This valve may be of any approved construction, a convenient device being a thermostatic valve which is so constructed as to be operated by the changes of temperature incident to vulcanization. When the vulcanizer is cool in loading or cooling before opening the press, the valve will be open, when the heat is raised for vulcanization, the valves will close. As a result of this construction, the air bags or interiors of the several tires will receive pressure from the pipe 12 to expand them properly. When the vulcanization commences, however, the bags will be shut off from each other and from the main supply. If any air bag leaks, or there is any escape from the individual tires, such leak will be confined to the single tire and there will be no possibility of the pressure being reduced in the other tires.

From the valves 16 extend flexible hose or conduits 17, the ends of which are provided with couplings 18 which are designed to be easily connected or disconnected from the valves 11. The hose is adapted to lie in one of the several grooves or channels 19 which are usually formed in the top of molds. It will be noted from an inspection of Fig. 2 that the several branches 15 from the headers are directed approximately tangential to the line of molds, the purpose of this construction being to give the several lines of hose sufficient room to bend so as to accommodate molds of varying depth without danger of breaking the lines.

The vulcanizer is operated in the usual manner, the platen being raised to the level of the top of the casing and as each mold is placed on the platen or on the earlier mold, the respective flexible conduits are attached to the valves. When the press is filled, the connection 13 is established, the top is applied and the vulcanization proceeds in the regular course. The flexible length of tubing permits such movement of the ram as is necessary while the connection is maintained. The pressure is applied to the manifold before the heat is raised to its limit, and when the valves are shut off, the several tires are isolated. When the molds are cooled, as is always done before emptying a vulcanizer, the valves will open and the pressure may be relieved. As the ram ascends to discharge its mold, the several pipes are disconnected.

It will be understood by those skilled in the art that the construction here shown and described is a compact and conveniently operable arrangement for conducting fluid pressure, either hydraulic or air pressure, from an exterior source of supply to the interior of the molds. The pressure may be applied to the air bags or inflated cores, or it may be admitted directly to the tire casing if it is properly sealed. The valve mechanism in connection with the individual conduits affords an easy and effective means for isolating the several molds and prevents a leak in a single mold ruining the entire group of tires being vulcanized.

While the thermostatic valve is an easily operable and convenient device for shutting off communication between the several tires during the application of pressure, we do not intend to be limited to this form of device, but others may be substituted for it, the essential feature being that means are provided for preventing the effects of a leaky construction in one tire from ruining the entire lot of tires.

The location of the manifold may be changed without affecting the invention, and other changes can be incorporated in the structure without sacrificing any of the benefits of the invention.

We claim:

1. In combination with a vulcanizer having a movable platen, a source of pressure supply, a permanent distributing medium, and conduits leading from said medium to the several molds.

2. In combination with a vulcanizer having a movable platen, a source of pressure supply, a permanent manifold movable with the platen, and conduits leading from said manifold to the several molds.

3. In combination with a vulcanizer having a movable platen, a manifold carried on said platen and extending at the side of the molds receivable thereon, conduits leading from said manifold, and means on the conduits for connecting them with the interior or the tires.

4. In combination with a vulcanizer having a movable platen, a manifold carried on said platen and extending at the side of the molds receivable thereon, a plurality of conduits leading from the said manifold, means for conveying fluid pressure to said manifold and releasable connections at the ends of said conduits adaptable for connection with the molds.

5. In combination with a vulcanizer having a movable platen, an upright manifold carried on said platen and extending beside the molds receivable thereon, a plurality of flexible conduits leading from said manifold, means for conducting fluid pressure to said manifold, and connections at the ends of said conduits through which communication may be established with the interior of the several molds.

6. In combination with a vulcanizer having a movable platen, a permanent manifold movable with said platen, a source of pressure supply external to the vulcanizer, connections from the source of supply to the manifold which permit movement of the platen and manifold, and conduits extending from said manifold.

7. In combination with a vulcanizer having a movable platen, a rigid manifold movable with said platen, a source of pressure supply external to the vulcanizer, releasable connections from the source of supply to the manifold, and conduits extending from said manifold.

8. In combination with a vulcanizer having a movable platen, a source of pressure supply, a manifold secured to the platen and extending beside the molds thereon, a releasable connection at the end of the manifold for the pressure supply, and flexible conduits along said manifold, each conduit having means for connecting it with the mold.

9. In a vulcanizing apparatus, in combination, means for conducting fluid pressure from the exterior of the vulcanizer to the interior of the tires in the vulcanizer, and mechanism operable while the vulcanizer is closed for isolating each tire during vulcanization.

10. In a vulcanizing apparatus, in combination, means for conducting fluid pressure to the interior of the vulcanizer, a distributing system to supply pressure to the tires in the vulcanizer, and valve mechanism in the system to isolate the several tires during vulcanization, said mechanism being operable during vulcanization.

11. In a vulcanizing apparatus, in combination, means for conducting fluid pressure to the interior of the vulcanizer, a distributing manifold, a plurality of conduits leading from said manifold, a valve in each conduit, and means to operate the valve after the vulcanizer is closed.

12. In a vulcanizing apparatus, in combination, means for conducting fluid pressure to the interior of the vulcanizer, a manifold, a plurality of conduits leading from the manifold, a valve in each conduit, and automatic means to operate the valve after the vulcanizer is closed.

13. In a vulcanizing apparatus, in combination, means for conducting fluid pressure to the interior of the vulcanizer and to the interior of the tires in the vulcanizer and valve mechanism within the vulcanizer operable while the vulcanizer is closed for isolating the tires during vulcanization.

14. In a vulcanizing apparatus, in combination, means for conducting fluid pressure to the interior of the vulcanizer, a distributing system within the vulcanizer connected therewith to supply pressure to the tires in the vulcanizer, and valve mechanism in the system operable while the vulcanizer is closed to isolate the pressure in the tires during vulcanization.

15. In a vulcanizing apparatus, in combination, means for conducting fluid pressure to the interior of the vulcanizer, a plurality of conduits leading from said means, a valve in each conduit and means to operate the valve after the vulcanizer is closed.

16. In a vulcanizing apparatus, in combination, a vulcanizing press, a source of pressure supply leading into the press, a manifold within the press, conduits from the manifold leading to the molds, and a valve operable while the press is closed, to close each conduit.

17. In a vulcanizing apparatus, in combination, a vulcanizing press, a source of pressure supply leading into the press, a distributing system within the vulcanizer having connections with each mold, and valve mechanism in the system to isolate the pressure within the molds, and means to operate the valve mechanism when the press is closed.

18. In a vulcanizing apparatus, in combination, a vulcanizing press, a source of pressure supply leading into the press, a manifold within the press, conduits from the manifold leading to the molds, and a thermostatically operated valve in each conduit.

19. In a vulcanizing apparatus, in combination, a vulcanizing press, a source of pressure supply leading into the press, a distributing system within the vulcanizer having connections with each mold and thermostatically operable valve mechanism in the system to isolate the pressure within the molds.

20. In a vulcanizing apparatus, in combination, a vulcanizing press, a source of pressure supply leading into the press, a manifold within the press, conduits from the manifold leading to the molds, and an automatically operated valve in each conduit.

21. In a vulcanizing apparatus, in combination, a vulcanizing press, a source of pressure supply leading into the press, a distributing system within the vulcanizer having connections with each mold, and automatically operable valve mechanism in the system to isolate the pressure within the molds.

22. In a vulcanizing apparatus, in combination, a vulcanizing press, a source of fluid pressure leading into the press, a movable platen in the press, a manifold movable with the platen and connected with said pressure source, conduits from said manifold leading to the molds, and a valve in each conduit.

23. In a vulcanizing apparatus, in combination, a vulcanizing press, a source of fluid pressure leading into the press, a movable platen in the press, a manifold movable with the platen and connected with said pressure source, conduits from said manifold leading to the molds, a valve in each conduit, and means to operate said valve while the press is closed.

24. In a vulcanizing apparatus, in combination, a vulcanizing press, a movable platen in the press, a source of fluid pressure leading into the press, a manifold secured to said platen, connections from said source of pressure to said manifold, a plurality of conduits from said manifold to the molds, a valve in each conduit, and means to operate said valve acting during the time the press is closed for vulcanization.

25. In a vulcanizing apparatus, in combination, a vulcanizing press, a source of fluid pressure leading into the press, a movable platen in the press, a manifold movable with the platen and connected with said pressure source, conduits from said manifold leading to the molds, a valve in each conduit, and means responsive to the changes in temperature in the vulcanizer to operate the valve.

26. In a vulcanizing apparatus, in combination, a vulcanizing press, a suorce of fluid pressure leading into the press, a movable platen in the press, a manifold movable with the platen and connected with said pressure source, conduits from said manifold leading to the molds, a valve in each conduit, and automatic operating means for the valve.

27. In a vulcanizer adapted to receive separable molds, in which the mold is closed by the movable parts of the vulcanizer, the combination of means permanently connected to a movable part of the vulcanizer for conducting fluid pressure to the several molds, and means for connecting or disconnecting the individual molds.

28. In a vulcanizer adapted to receive separable molds, in which the mold is closed by the movable parts of the vulcanizer, the combination of means for conducting fluid pressure into the several molds, and valve mechanism operable to close when the vulcanization is started and to open after the vulcanization is completed.

29. In a vulcanizer adapted to receive separable molds, in which the mold is closed by the movable parts of the vulcanizer, the combination of means for conducting fluid pressure into the several molds, and thermostatic valve mechanism operable to close when the vulcanization is started and to open after the vulcanization is completed.

30. In a vulcanizer adapted to receive separable molds, in which the mold is closed by the movable parts of the vulcanizer, the combination of means for conducting fluid pressure into the several molds, and valve mechanism automatically operable to close when the vulcanization is started and to open after the vulcanization is completed.

OSCAR F. BECK.
JAMES W. SPEERS.
ROBT. R. JONES.